United States Patent [19]

Goodier

[11] Patent Number: 4,773,493

[45] Date of Patent: Sep. 27, 1988

[54] VIBRATION TYPE MEASURING APPARATUS

[75] Inventor: Peter T. Goodier, Pascoe Vale, Australia

[73] Assignee: Sensor International, Seattle, Wash.

[21] Appl. No.: 69,029

[22] Filed: Jul. 1, 1987

[30] Foreign Application Priority Data

Jul. 1, 1986 [AU] Australia .............................. PH06681
Aug. 19, 1986 [AU] Australia .............................. PH07544

[51] Int. Cl.[4] ............................ G01G 3/14; G01L 1/10
[52] U.S. Cl. .............................. 177/210 FP; 73/862.59
[58] Field of Search ................... 177/210 FP; 73/826, 73/862.59, DIG. 1; 310/361

[56] References Cited

U.S. PATENT DOCUMENTS

| | | |
|---|---|---|
| 3,238,789 | 3/1966 | Erdley . |
| 3,411,347 | 11/1968 | Wirth et al. ...................... 73/862.59 |
| 3,437,850 | 4/1969 | Bunger . |
| 3,470,400 | 9/1969 | Weisbord . |
| 3,488,530 | 1/1970 | Staudte . |
| 4,037,121 | 7/1977 | Nakamura et al. . |
| 4,058,007 | 11/1977 | Exner ............................... 73/862.59 |
| 4,215,570 | 8/1980 | EerNisse . |
| 4,299,122 | 11/1981 | Ueda et al. ....................... 73/862.59 |
| 4,320,320 | 3/1982 | Momosaki et al. .................. 310/361 |
| 4,321,500 | 3/1982 | Paros et al. . |
| 4,372,173 | 2/1983 | EerNisse et al. . |
| 4,378,702 | 4/1983 | Meier ................................. 73/826 |
| 4,384,495 | 5/1983 | Paros . |
| 4,406,966 | 9/1983 | Paros . |
| 4,446,394 | 5/1984 | Albert . |
| 4,503,715 | 3/1985 | Greenwood . |
| 4,538,461 | 9/1985 | Juptner et al. . |
| 4,541,495 | 9/1985 | Willi et al. . |
| 4,544,858 | 10/1985 | Nishiguchi et al. . |
| 4,618,014 | 10/1986 | Kobayashi . |
| 4,623,030 | 11/1986 | Portman, Jr. et al. ....... 177/210 FP |

OTHER PUBLICATIONS

"Force Sensor Using Double-Ended Tuning Fork Quartz Crystals," Proceedings of the 37th Annual Symposium on Frequency Control, pp. 248-254, 1983, by Shih S. Chuang.
"Practical Considerations for Miniature Quartz Resonator Force Transducers," Proceedings of the 37th Annual Symposium on Frequency Control, pp. 255-260, 1983, by Errol P. EerNisse and Jerome M. Paros.

Primary Examiner—George H. Miller, Jr.
Attorney, Agent, or Firm—Finnegan, Henderson, Farabow, Garrett & Dunner

[57] ABSTRACT

The invention relates to a weight measuring apparatus utilizing a vibration type force sensor having a greatly increased Q and being inexpensive and easy to manufacture. The force sensor includes a single vibratory beam or a pair of vibratory beams, which oscillate at a particular measurement frequency related to the stress applied to the sensor by a weight. A rotational mass is coupled to a nodal point of the vibratory beam at the measurement frequency, and greatly influence the frequency at which the beam will vibrate. As a result, the tolerances for manufacture of the force sensor are greatly relaxed, and the pendulum-like movement of the rotational masses for a double-ended tuning fork type sensor tends to override any mismatch between the two parallel vibratory beams.

48 Claims, 3 Drawing Sheets

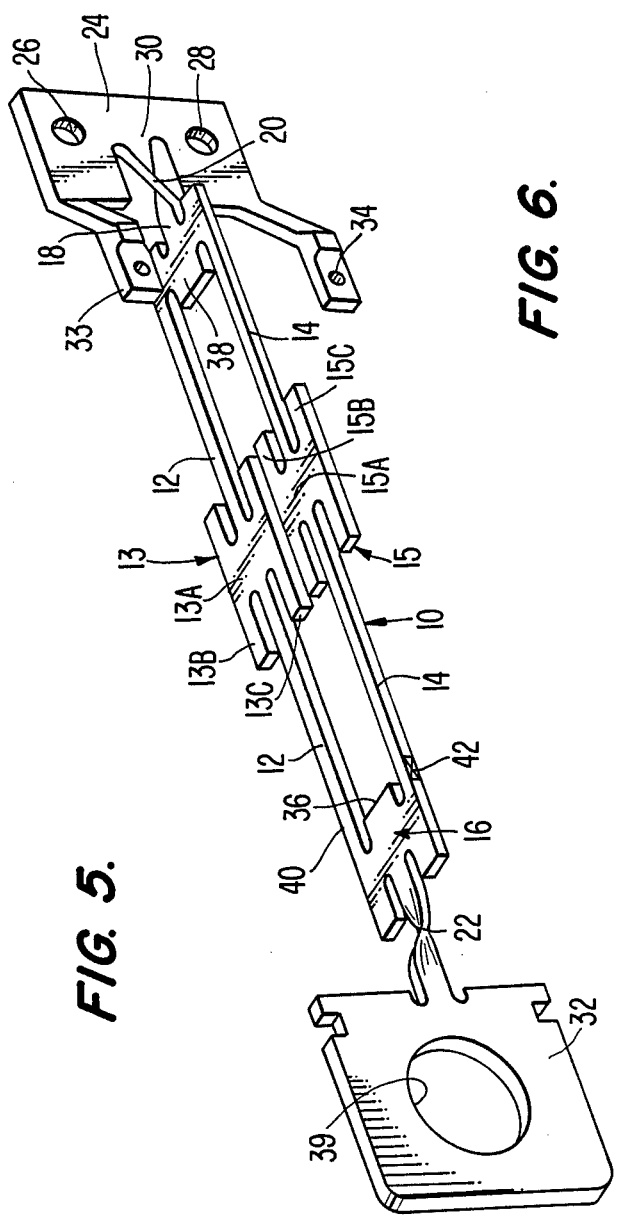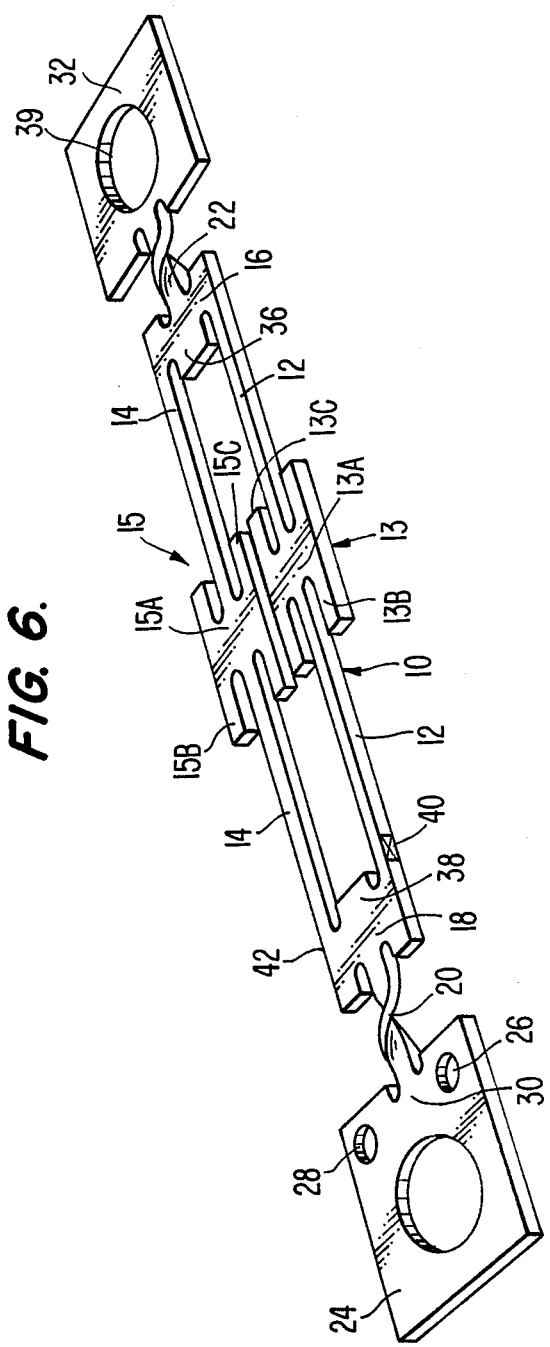

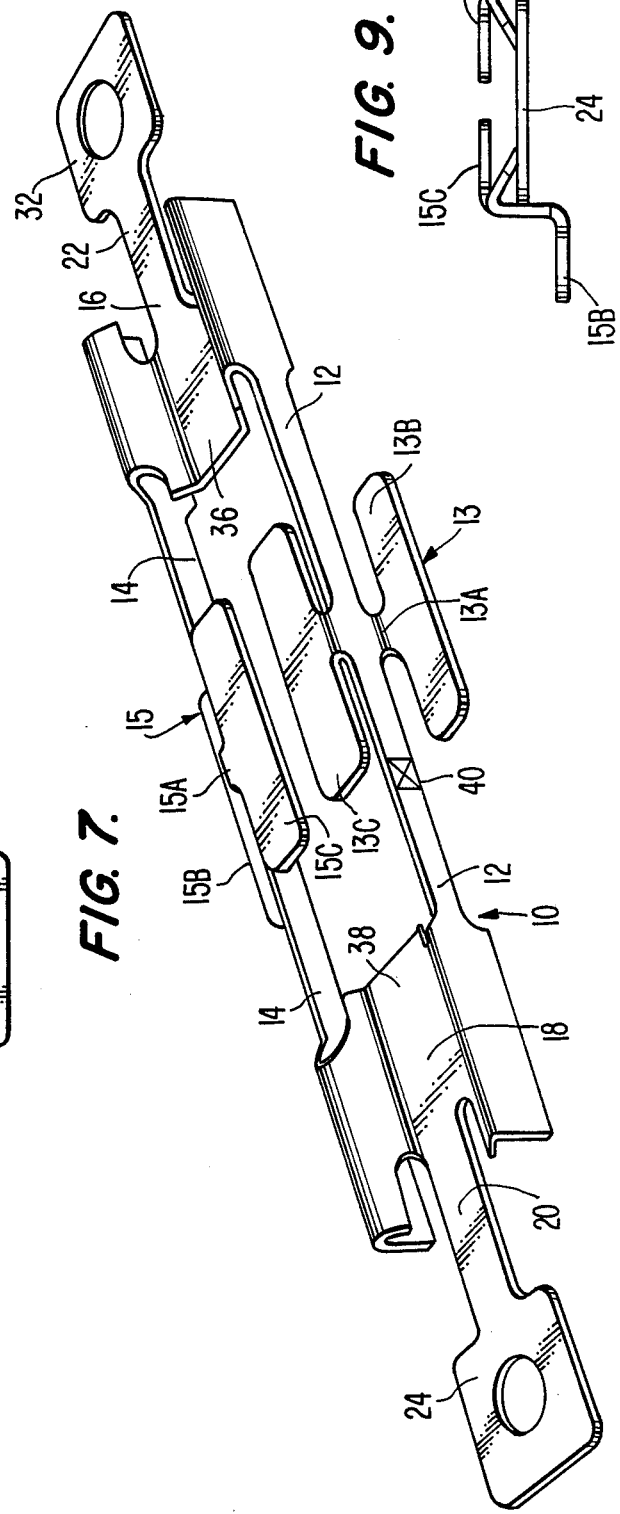

VIBRATION TYPE MEASURING APPARATUS

FIELD OF THE INVENTION

The present invention relates to apparatus for measuring a force (weight) using a vibratory beam having a rotational mass.

BACKGROUND OF THE INVENTION

Force sensors of the vibration type are well known to those involved in the measurement of (weights). Force (weight) transducers of the vibration type are advantageous in that construction is simple and does not require use of an analog-to-digital converter because a digital value, the number of vibration waves, is directly produced. In a vibration type apparatus, a vibratory beam is excited, and vibrates at particular frequencies related to the amount of stress applied to the vibratory beam. The frequency of vibration is also dependant on the stiffness of the beam, which should remain relatively constant for a vibratory beam of a given length and cross-section (aspect ratio).

The mechanical Q of an apparatus including a vibratory beam as the force (weight) sensor is proportional to the ratio of the energy stored in the beam to the energy lost by the beam for each cycle of vibration. A system with a low Q is undesirable because damping of the vibration used to measure the weight will occur, resulting in a far less stable resonant frequency and an increased tendency to crossover to unwanted resonant frequencies. A system with a high Q will maintain the oscillations of the vibratory beam, can use a smaller source of external energy to excite the vibratory beam, and will possess a more stable resonant frequency.

When a vibratory beam is used as the force sensor in a weighing apparatus, a stress due to the weight being measured is applied to a first end of the beam, while the sensor is stably mounted at the second end of the beam. When a single vibratory beam is used as the sensor, however, vibratory energy is lost at the mounted end of the beam, resulting in a lower Q for the system and damping of the vibrations. With a single vibratory beam, there is no balancing of forces at the mounted end of the sensor. The single beam vibrates and applies a moment to the sensor at its mounted end. In order to avoid a loss of energy due to damping at the mounted end of the sensor, a pair of parallel vibratory beams forming a double-ended tuning fork can be provided as the sensor. Another method used to minimize the energy loss (and accompanying decrease in Q) resulting from the force tending to rotate the mounted end of a single vibratory beam involves attaching each end of the single beam to a heavy intermediate mass having a large inertia, which is connected to the rest of the apparatus using flexible members. This method, however, cannot completely cancel out the forces applied to and the energy lost at the mounted end, and increases the expense, size, and complexity of the weighing apparatus.

In a sensor of the double-ended tuning fork type, typically one piezoelectric element on one beam is used to excite the tuning fork, while a second piezoelectric element on the second vibratory beam is used as a vibration pickup element. The vibratory beams are coupled together at their respective first and second ends. The pair of vibratory beams will oscillate at a measurement frequency that is determined by the length, cross-section, and stiffness of the two beams, and by the stress applied to the two beams when a force (weight) is being measured. When each of the pair of vibratory beams is practically identical, they will both oscillate at the same measurement frequency, but will oscillate 180° out of phase. As a result, at the ends of each beam, the vibrations from each beam will cancel each other out, thereby preventing any moment from being applied to the mounted end of the sensor. Therefore, less vibration energy of the sensor is lost at the ends of the beams, and force (weight) measuring apparatus using a pair of parallel vibratory beams will have a higher Q than a similar system with a single vibratory beam.

However, in a conventional weighing apparatus using a vibratory beam, it is extremely difficult to manufacture a sensor that has a high Q. Thus, for a sensor utilizing a pair of parallel vibratory beams, tight tolerances are required during manufacture to ensure that there is no mismatch between the two beams that will create a difference in the resonant frequencies of each beam. In particular, the manufacturer must ensure that the two beams are equal in length, cross-section, and stiffness, and the stress due to the force (weight) being measured must be applied equally to the first end of each of the two beams. Otherwise, the frequency difference decreases the Q and eventually causes bistable operations of the beams in an oscillator circuit. In some cases, the oscillation ceases. Because tight tolerances (within microns) are necessary, the vibratory beams are fabricated using a precise method of cutting. As a result, conventional vibration type weighing apparatus are not, for example, molded or fabricated using a press tool.

In practice, sensors constructed by molding or using a press tool achieve a Q only on the order of approximately 150-250. Therefore, there is a need for a force sensor having a vibratory beam or beams that can attain higher values of Q but which can be manufactured within a broader tolerance with lower cost methods, such as by molding or using a press tool.

Additionally, typical force sensors, such as disclosed in U.S. Pat. No. 4,215,570, disclose a double-ended tuning fork formed out of piezoelectric quartz. Several disadvantages are associated with these types of sensors. Correct crystallographic orientation of the sensor is required in order to minimize any dependence of the resonant frequencies of the sensor on temperature. The sensors are manufactured by photolithographic etching or diamond machining and are relatively expensive to produce. Furthermore, the quartz sensors are very delicate and cannot withstand a high loading. In practice, they are used to sense weights of only a few kilograms. When heavy weights are measured, the associated force is not directly applied to the fragile quartz sensor. Instead, a strain proportional to the weight is applied to the sensor by means of a lever arrangement. Therefore, such sensors must contain several additional parts, further increasing the cost of producing the apparatus.

SUMMARY OF THE INVENTION

It is an object of the present invention to provide a vibration type force sensor that has a high Q.

It is a further object of the invention to provide a sensor in which there are higher tolerances allowed in the manufacture of the vibratory beam or beams.

A still further object of the invention is to provide a force sensor that can be conveniently and inexpensively fabricated.

Another object of the invention is to provide a sensor for a weighing apparatus that is rugged in construction.

An additional object of the invention is to provide a force sensor in which the force (weight) being measured can be directly applied to an end of the vibratory beam or beams without use of a lever arrangement.

It is still another object of the invention to provide a vibratory beam or beams for a weighing apparatus having an increased measuring range.

A further object of the invention is to provide a double-ended tuning fork type apparatus in which the stress from a force (weight) being measured is applied equally to each of the two vibratory beams.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the objects and in accordance with the purposes of the invention, as embodied and broadly described herein, the apparatus for measuring a force (weight) in accordance with this invention comprises: a vibratory beam having a portion which vibrates back and forth at a measurement frequency, having a nodal point that does not vibrate back and forth at the measurement frequency, and having a first and second end; support means for supporting the force (weight) to be measured; means for coupling the first end of the vibratory beam to the support means for applying a stress to the vibratory beam that determines the measurement frequency at which the beam vibrates; and a rotational mass coupled to the nodal point of the vibratory beam that rotates at the measurement frequency.

In a further embodiment of the invention, the apparatus further comprises a pair of parallel vibratory beams coupled together at a first end and a second end of each beam and forming a tuning fork, each beam having a nodal point that does not vibrate back and forth at the measurement frequency.

The accompanying drawings, which are incorporated in and constitute a part of the specification, illustrate preferred embodiments of the invention and, together with the description, serve to explain the principles of the invention.

BRIEF DESCRIPTION OF THE DRAWINGS

FIG. 5 is a perspective view of one embodiment of the invention.

FIG. 6 is a perspective view of another embodiment of the invention.

FIG. 7 is a perspective view of still another embodiment of the invention.

FIG. 8 is a plan view of a metal blank from which the embodiment shown in FIG. 7 was made.

FIG. 9 is an end view showing the rotational masses of the embodiment shown in FIG. 7.

DESCRIPTION OF THE PREFERRED EMBODIMENTS

Reference will now be made in detail to the present preferred embodiments of the invention, examples of which are illustrated in the accompanying drawings.

Figure 1:
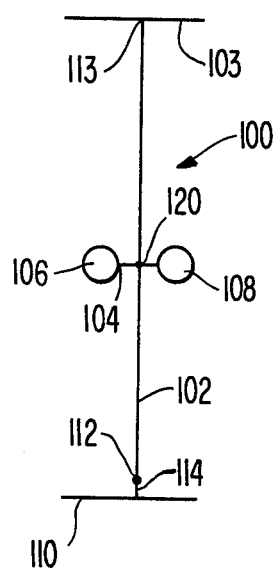
FIG. 1 is a sketch of a vibratory beam with a rotational mass coupled to a nodal point.
Figure 2:
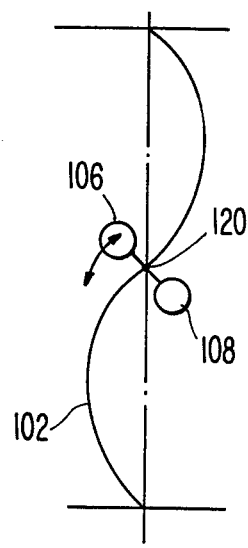
FIG. 2 is a sketch of a vibratory beam with a rotational mass coupled to a nodal point.
Figure 3:
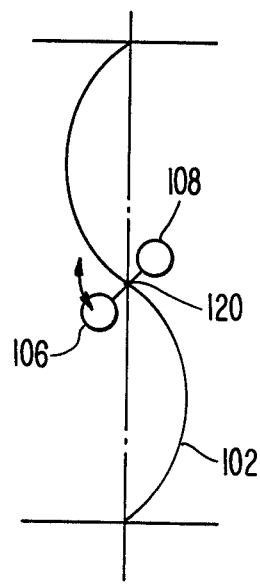
FIG. 3 is a sketch of a vibratory beam with a rotational mass coupled to a nodal point.

Sketches of a preferred embodiment of the force (weight) measuring apparatus in operation at a particular measurement frequency are shown in FIGS. 1–3. This apparatus includes a vibratory beam, a portion of which vibrates back and forth at a measurement frequency, having a nodal point that does not vibrate back and forth at the measurement frequency, and having a first and second end. As embodied herein, a force sensor 100 includes a vibratory beam or bar 102. The vibratory beam has a first end 112 and a second end 113. Preferably, the second, or mounted, end of vibratory bar 102 is attached to a mounting means 103 for securing the second end of the vibratory bar.

In accordance with the present invention, support means is provided for supporting the force (weight) to be measured. The invention includes means for coupling the first end of the vibratory bar to the support means for applying a stress to the vibratory beam that determines the measurement frequency at which the beam vibrates. As embodied herein, a weight to be measured is hung on the support means 110, which is coupled to first end 112 of the vibratory beam by coupling means 114. As a result, the weight applies a stress to vibratory beam 102 that is proportional to the resonant frequencies at which the beam will vibrate when excited.

The invention includes a rotational mass coupled to the nodal point of the vibratory beam that rotates at the measurement frequency. As here embodied, an arm member 104 extends at right angles to vibratory bar 102, and the free ends of the arm are attached to spherical rotational masses 106 and 108. Arm member 104 in FIG. 1 couples rotational masses 106 and 108 to the nodal point 120 of vibratory beam 102.

The location of the appropriate nodal points along vibratory bar 102 is dependent upon the fundamental frequency at which the bar vibrates and the measurement frequency chosen for measuring the force (weight). The vibratory beam/rotational mass combination has a fundamental resonant frequency at which it can vibrate, which is dependent on the length, cross-section, and stiffness of the vibratory beam, on the weight of the rotational mass and the distance the mass is offset from the nodal point of the beam, and on the stress applied to the vibratory bar by the force (weight) being measured. At the fundamental resonant frequency, maximum vibration back and forth occurs at the center of the vibratory beam, whereas nodal points are located at the first and second ends of the vibratory beam. Vibratory beam 102, however, can also vibrate at the frequency of the second harmonic, which is approximately twice the frequency of the fundamental. When vibrated at the frequency of the second harmonic of the fundamental resonant frequency, an additional nodal point is located exactly in the middle of vibratory beam 102. In the embodiment of FIGS. 1–3, vibratory beam 102 is being vibrated at the second harmonic of the fundamental resonant frequency. Therefore, at central nodal point 120 in FIGS. 1–3, there is no vibration back and forth of vibratory beam 102. Instead, nodal point 120 rotates at the measurement frequency.

Vibratory beam 102 may be formed of a piezoelectric type material, such as quartz. In the preferred embodiment, however, vibratory bar 102 is formed of a non-piezoelectric material, such as a suitable metal, such as beryllium copper. When a piezoelectric material is not used in forming vibratory bar 102, a piezoelectric driver (not shown) is preferably mounted on vibratory bar 102 to excite the vibratory bar and cause it to vibrate. When all other factors are kept constant, the force (weight) being applied to the beam can be measured using a piezoelectric receiver (not shown) acting as a vibration pickup element, because the frequency of vibration of bar 102 will be proportional to the force applied by the weight on support means 110 coupled to first end 112 of the bar.

Preferably, the coupling means directly connects the first (free) end of vibratory beam 102 to support means 110. However, stress can be applied to free end 112 of the vibratory bar using a lever arrangmeent, particularly when vibratory bar 102 is formed of a fragile material, such as quartz, which typically cannot support weights above 1-2 kilograms.

As shown in FIGS. 1-3, a rotational mass coupled to the nodal point in the present invention responds to vibration of the vibratory bar. FIGS. 2 and 3 illustrate the pendulum-like motion, with the movements being greatly exaggerated in order to assist in understanding the operation of the invention. The rotational mass is coupled to vibratory bar 102 in order to become a dominant factor in determining the precise measurement frequency at which vibratory bar 102 will vibrate. As the beam oscillates from one phase to the next, this rotates a mass coupled to a nodal point along the vibratory bar back and forth about the nodal point in a pendulum-like motion.

Use of a rotational mass coupled to an nodal point of a vibratory bar provides significant advantages for the apparatus of the present invention over conventional vibration type apparatus. Most importantly, a dramatic rise in Q is obtained because the resonant frequency of the vibratory beam is now determined by both the parameters for the vibratory beam and those for the rotational mass. The ratio of energy stored to energy lost by the system is increased because a rotational mass moving like a pendulum act as a mechanical flywheel that absorbs any energy spikes, and enhances the ability of the sensor to resist any changes in frequency that would be induced by short term influences from either internal or external sources. The apparatus of the present invention exhibits an order of magnitude improvement in Q over apparatus manufactured by molding or using a press tool in which no rotational masses are used. Another important advantage is the sizeable relaxation in manufacturing tolerances that occurs, resulting in apparatus having the same Q as conventional apparatus but which can be produced much more conveniently and at lower cost. This relaxation in tolerances is due to the fact that the resonant frequency is dramatically influenced by the presence of rotational masses exhibiting pendulum-like motion, so that the vibratory beam in itself is no longer the crucial factor in determining the resonant frequency of the sensor.

Figure 4:
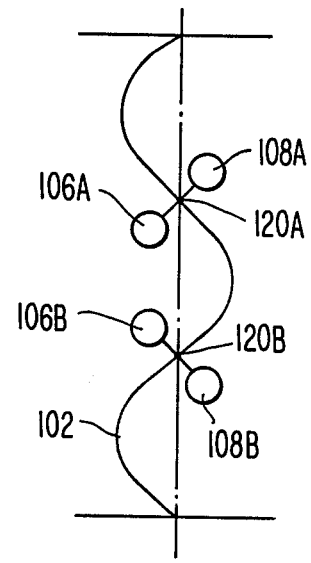
FIG. 4 is a sketch of a vibratory beam with a pair of rotational masses coupled to a pair of nodal points.

The present invention can be utilized at the measurement frequency (and nodal points) associated with any harmonic or overtone of the fundamental resonant frequency. For example, in FIG. 4 the measurement frequency at which the vibratory bar is being vibrated is the first overtone of the fundamental resonant frequency. When vibrated at the first overtone, the vibratory beam will have two nodal points not located at the ends of the bar. As shown in FIG. 4, a first nodal point 120a is located closer to the mounted end of the vibratory bar, whereas a second nodal point 120b is located closer to the free end of vibratory bar 102. A first pair of rotational masses 106a and 108a is coupled to first nodal point 120a, and a second pair of rotational masses 106b and 108b is coupled to second nodal point 120b. Comparison of FIG. 4 with FIGS. 1-3 shows that the present invention operates in a completely analogous manner regardless of the number of nodes associated with the particular measurement frequency being used. When the mode of oscillation of vibratory bar 102 is varied to occur at a particular harmonic or overtone, the objects of the invention can be achieved by providing a rotational mass coupled to all or to selected ones of the nodal points associated with that particular frequency of vibration.

The present invention may include a pair of parallel vibratory beams coupled together at a first end and a second end of each beam and forming a tuning fork, with each beam having a nodal point that does not vibrate back and forth at the measurement frequency. One preferred embodiment of the invention is shown in FIG. 5. As embodied herein, force sensor 10 includes two parallel vibratory beams 12 and 14. First beam 12 and second beam 14 are coupled together at a first end portion 16 and a second end portion 18. Assuming that the sensor is vibrated at the second harmonic, the intermediate nodal point for each of the beams will be located at its center.

As embodied herein, a rotational mass 13 is coupled to the nodal point of first bar 12, and a rotational mass 15 is coupled to the nodal point of second bar 15. Preferably, the rotational masses are coupled to the nodal point by arm members 13a and 15a, and each rotational mass is in the form of a H-section, having limbs 13b, 13c and 15b, 15c respectively coupled to arm members 13a and 15a.

In accordance with one aspect of the invention, the sensor has a first and a second end portion that respectively couple the first ends and second ends of the first and second vibratory beams together. As embodied herein, end portion 16 couples together the first (free) end of vibratory bars 12 and 14. Second end portion 18 couples together the second (mounted) end of the first and second vibratory bars.

Preferably, each end portion includes a protrusion projecting inwardly for cancelling vibration in the end portion. As embodied herein, first end portion 16 has a protrusion 36 extending towards the second end of the vibratory bars, while second end portion 18 has a protrusion 38 extending towards the first end of the vibratory bars. When the vibratory bars in a weighing apparatus are vibrated, small oscillations tend to occur in the end portions that couple together the ends of the double-ended tuning fork. However, the use of protrusions on these end portions that project inwardly tends to increase the Q of the sensor by somehow absorbing or assisting in cancellation of these unwanted vibrations in end portions 16 and 18.

In the preferred embodiment, the means for coupling the first end of the first and second vibratory bars to the support means directly connects the support means to the first end portion without a lever arrangement. This direct connection eliminates the complicated and expensive lever systems that are required when quartz sensors are used in a weighing apparatus, thereby simplifying the weighing apparatus and allowing it to be produced at a much lower cost. Preferably, the means for coupling to the support means is a longitudinal extension. As embodied herein, first end portion 16 is directly connected to load plate 32 by first longitudinal extension 22.

In this preferred embodiment of the invention, a mounting means is provided for the apparatus, and the apparatus includes a means for coupling the second end portion to the mounting means for minimizing damping of the first and second vibratory beams. As embodied herein, second end portion 18 is coupled to a mounting plate 24 by second longitudinal extension 20.

The inclusion of coupling means between each end portion of the double-ended tuning fork and the support means for the force (weight) to be measured and the mounting means for the apparatus performs important functions. As embodied herein, the longitudinal extensions tend to attenuate uncancelled oscillations from end portions 16 and 18, and isolate mounting plate 24 and load plate 32 from the oscillating tuning fork. As a result, less damping of the desirable vibrations in the first and second vibratory bars will occur, and the mechanical Q of the sensor is increased. Additionally, this isolation between the mounting means and the tuning fork minimizes any damping of the vibratory bars that may occur as a result of the relatively stationary nature of mounting plate 24.

In the preferred embodiment of the invention, an extension that is twisted is provided for coupling the first end portion to the support means in order to apply substantially the same stress to the first and second vibratory beams. As embodied herein, first longitudinal extension 22 diectly connects first end portion 16 to load plate 32, which contains a hole 39. When the sensor is used for weight measurement, the weight being measured may be hung directly from sensor 10 by applying the weight to the load plate using hole 39. Thus, for example, a weighing pan suspended from a hook may be attached to load plate 32. As indicated previously, in apparatus using a double-ended tuning fork, it is important for the resonant frequencies of each of the two vibratory beams to match. However, the resonant frequency of each beam will be dependent upon the amount of stress applied to that beam, and therefore it is necessary for any stress on the sensor due to the force (weight) being measured to be applied equally to each of the two beams. Therefore, it is preferable for a 90° twist to be present in first longitudinal extension 22. This twist is very effective in evening out the load applied to each of the two beams. A twist in the extension will even out differential loadings between first vibratory beam 12 and second vibratory beam 14 when the forces on each beam are not otherwise even, such as when the weight is shifted off center or the pan is swinging.

Preferably, the means for coupling the second end portion to the mounting means also comprises an extension that is twisted for applying essentially the same stress to the first and second vibratory beams. As embodied herein, second longitudinal extension 20 is also twisted 90° in order to even out any differential loading on the first and second vibratory beams.

As embodied in FIG. 5, mounting plate 24 is substantially C-shaped. The function of the mounting plate is to rigidly secure the sensor to some device (not shown). In this embodiment, the sensor is secured using a mounting hole or holes in mounting plate 24. As embodied herein, two mounting holes 26 and 28 are provided which are equidistant from the longitudinal axis of the sensor. Mounting holes are positioned in order to leave the central area 30 of mounting plate 24 free, thereby minimizing damping of each of the vibratory beams. Alternately, a single mounting hole can be provided in mounting plate 24 along the longitudinal axis of the sensor, thereby preventing the applying of uneven stresses to each of the two vibratory beams. It is generally preferred to use a single mounting hole rather than two in order to avoid the application of uneven stresses to the two beams. This can occur because the mounting plate, when secured using a pair of bolts in mounting holes 26 and 28, tends to move and bend when a force (weight) is applied to load plate 32.

The invention preferably includes a piezoelectric receiver coupled to a vibratory beam for generating output signals at the measurement frequency at which the vibratory beam is vibrating back and forth. As embodied herein, piezoelectric receiver 42 is mounted on second vibratory beam 14.

When the vibratory beam is made of non-piezoelectric material, such as metal, the invention may include a piezoelectric driver, coupled to a vibratory beam, that vibrates when input signals are applied to the driver. As embodied in FIG. 5, piezoelectric driver 40 is mounted on first vibratory beam 12. In operation, a pulsed input signal is provided to piezoelectric driver 40, causing the driver and beam 12 on which it is mounted to vibrate. When the vibratory beam is vibrating at a resonant frequency, a subsequent pulsed input signal will excite the driver 40 and beam 12 at the precise time that beam 12 has vibrated back and forth to the same position it was in when the previous pulsed input signal was received by driver 40. In a double-ended tuning fork type sensor, the vibration in beam 12 results in a vibration 180° out of phase in second vibratory beam 14. This vibration in beam 14 is detected by piezoelectric receiver 42 mounted on beam 14, which generates output signals having the same frequency as the frequency of vibration of the vibratory beams. The output signals from receiver 42 can be fed back to driver 40, resulting in a system that oscillates at a particular measurement frequency. The resonant frequency at which each of the vibratory beams will vibrate is determined purely on a mechanical basis by the characteristics of the vibratory beam or beams and the rotational mass or masses, and by the stress applied to the vibratory beams by the force (weight) being measured.

In a preferred embodiment of the invention, microcomputer means is coupled to the piezoelectric receiver and responsive to the output signals for determining the size of the force (weight). As embodied herein, legs 33 and 34 are provided on mounting plate 24 as a means for attaching a printed circuit board to the sensor. To avoid interference with sensor 10, legs 33 and 34 are bent to allow a parallel mounting of the printed circuit board. The printed circuit board may include the electronics for sensing and analyzing the output signals from piezoelectric receiver 42, including the microcomputer means.

Typically, a microprocessor and a counter are used to measure the frequency at which the vibratory beams are vibrating. In one preferred method, the number of output pulses is counted until a fixed number is reached, and the frequency of vibration can be determined based on the number of clock cycles that occurred during the generation of the fixed number of output pulses. In an alternate method, the number of output pulses from the piezoelectric receiver is counted for a fixed number of clock cycles, and the number of output pulses counted is used by the microprocessor in determining the frequency at which the vibratory beam is vibrating. In another preferred embodiment of the invention, the circuit board attached to legs 33 and 34 of sensor 10 may include a digital display for displaying the measured force (weight). As indicated above, the frequency at which the vibratory beams vibrate is proportional to the strain applied to the vibratory beams, therefore measurement frequency at which the vibratory beams are vibrating can be used to accurately determine the amount of force (weight) on the sensor. The microcomputer means is used to measure a change in the frequency of vibration of a vibratory beam when a force (weight) is supported by the support means, and calculates the amount of this force (weight) based on one change in frequency.

In a preferred embodiment of the invention, a piezoelectric receiver is coupled to a vibratory beam at a maximum point where the greatest vibration back and forth at the measurement frequency occurs for the vibratory beam. Similarly, a piezoelectric driver in a preferred embodiment will also be coupled to a vibratory beam at a maximum point. As embodied herein, the apparatus of FIG. 5 has a nodal point at the center of each vibratory beam. Assuming that the second harmonic is being used as the measurement frequency, vibration nodes occur at the center and at the ends of the vibratory beams, while the greatest vibration occurs at points exactly halfway between the center and the two end nodes of each vibratory beam. Therefore, when a vibratory beam is being excited by a piezoelectic driver at the second harmonic frequency, the greatest amount of vibration will be induced in the beam on which the driver is mounted if the driver is located at one of the two maximum points on the beam. On the other hand, when the vibratory beam is to be excited to vibrate at a particular measurement frequency and the piezoelectric driver is placed near a nodal point for that measurement frequency, the vibration back and forth of the beam will be relatively small.

Similarly, the piezoelectric receiver is best positioned at the peak of the waveform of the harmonic or overtone being used as the measurement frequency. When located at a maximum point of vibration at that measurement frequency on a vibratory beam, the piezoelectric receiver will generate the strongest output signals because of the large movement back and forth. Another advantage of placing the piezoelectric receiver in this position is that it assists in filtering out other resonant frequencies at which the vibratory bar may be vibrating but which do not correspond to the desired measurement frequencies. For example, if the second harmonic is used as the measurement frequency, the receiver would be placed at a point either one quarter or three quarters down the length of a vibratory beam. At these points, nodal points exist for any vibrations occurring at the frequency of the third harmonic, and vibrations at the fundamental frequency or first overtone are not at their maximum amplitude. As a result, positioning of the piezoelectric driver and piezoelectric receiver in this manner allows the same performance to be achieved with less electronic filtering of frequencies other than the desired measurement frequency.

In the FIG. 5 embodiment, driver 40 is mounted on first vibratory beam 12 and receiver 42 is mounted on second vibratory beam 14. However, in view of the symmetrical nature of the sensor, the positions of the driver and receiver can be reversed.

In the embodiment of the invention of FIG. 7, up to a one hundred kilogram weight is measured by a sensor including a pair of vibratory beams having dimensions of 38 mm long, 2 mm wide, and 0.55 mm thick. When a weighing apparatus in accordance with this embodiment of the invention is constructed using these dimensions, a measurement frequency of approximately 1.4 kilohertz for the second harmonic may be used as the measurement frequency. However, operation of the invention is not restricted to any particular frequency, and can also be practiced utilizing any harmonic or overtone as the measurement frequency. If the weight measuring apparatus were constructed without any rotational mass coupled to the nodal points of the vibratory beams, the equivalent measurement frequency would be approximately 3–4 kilohertz.

As embodied herein, each of weights 13$b$, 13$c$, 15$b$, and 15$c$ oscillate in a pendulum-like motion in the manner shown in FIGS. 1–3. As indicated above, the rotational masses are a critical element in determining the measurement frequency of the sensor. As a result of the providing of these rotational masses, any mismatch between the first and second vibrational beams tends to be over-ridden. Therefore, a vastly improved Q is achieved, and unlike conventional double-ended tuning fork arrangements, very tight manufacturing tolerances are not necessary to guarantee that the vibratory beams oscillate at the same frequency. In the conventional single or double vibratory beam arrangements, the length, cross-section, and stiffness of the vibratory beams are critical. In conrast, none of these three parameters for the rotational masses plays a critical role in the performance of the invention.

The providing of a rotational mass coupled to a nodal point on a vibratory beam and exhibiting pendulum-like motion achieves important advantages over conventional sensors fabricated using a single beam or a double-ended tuning fork arrangement. Not only is the Q of the system greatly increased, but a sizeable relaxation in manufacturing tolerances can be made, and the production cost for the sensor is greatly reduced. Furthermore, when using a pair of vibratory beams, minor differences between the respective rotational masses are not as critical as similar differences between the vibratory beams would be for conventional sensors, although the rotational masses cannot be too dissimilar to each other or else the vibratory beams will oscillate independently of each other. Furthermore, the rotational masses can assume a wide variety of shapes, sizes, and angles, although it is preferable for rotational masses coupled to a pair of vibratory beams to be fairly symmetrical to each other. Similarly, the rotational mass principle is applicable to any harmonic or overtone that is being used as the measurement frequency, as long as a rotational mass is coupled to a nodal point on the vibratory beam for that measurement frequency. The principal factors that appear to influence the measurement frequency when rotational masses are utilized are the weight of the rotational mass and the distance between the rotational mass and the nodal point to which it is coupled. These parameters are adjustable in order to achieve the highest value of Q, although the sensor will perform well for a reasonably wide tolerance. As embodied herein, an H-shaped rotational mass is preferable. When the rotational mass is moving like a pendulum, such a shape provides the smallest frontal area beating against the air, and therefore reduces energy loss by the sensor and increases the Q of the system. It is also preferable for the rotational masses to be relatively short and stubby, as opposed to extremely long. Such an arrangement minimizes the likelihod that the measurement frequency of the weighing apparatus will be greatly affected by a characteristic resonant frequency of a rotational mass configured similar to and acting like a separate vibratory beam. It is possible that other arrangements for a rotational mass may also achieve some of the objects of the invention. For example, a vibratory beam with bulges at its nodal points or made with heavier materials at its nodal points may have some of the same advantages as a rotational mass provided in another manner.

In a preferred embodiment of the invention, delicate materials such as quartz are not used in the fabrication of the elements of the sensor. Instead, the sensor is made out of any suitable metal or alloy. Beryllium copper is the preferred material to utilize because of its relatively high Q and relatively small creep characteristics. Certain grades of aluminum, such as 2014T6, exhibit a higher Q but suffer from a higher creep, whereas grade 7075T841 of aluminum will exhibit less creep but still has a creep 2-4 times higher than that of beryllium copper. Other materials can also be utilized, such as ceramic, aluminum oxide, mild steel, stainless steel, or high-tensile steels. The use of such materials improves the ruggedness of the sensor, and allows for more convenient and less expensive fabrication.

Another advantage of the preferred embodiments of the invention is that the size of the sensor can be easily varied to control the maximum load that is measured. Instead of fragile materials, such as quartz, the sensor can be fabricated using a more rugged material that can be directly connected to the support means, without a need for complicated lever systems that increase the cost and require the addition of several parts. The dimensions for each of the vibratory beams was given for a sensor in FIG. 7 that could support a weight of 100 kilograms. In order to support a weight of up to 200 kilograms, the sensor is easily modified by doubling the width of each of the vibratory beams from 2 millimeters to 4 millimeters. Thus, for the same applied stress, the vibratory beams will be able to carry twice the weight. It may be desirable, however, to keep the stiffness of the vibratory beams the same so that the same measurement frequency can be utilized. The stiffness of the vibratory beam is directly proportional to the width. Therefore, by doubling the width of a vibratory beam in order to double the measurable weight, the stiffness of the vibratory beam is also doubled. However, the stiffness is inversely proportional to the cube of the length of the vibratory bar. Therefore, in order to maintain the same measurement frequency, the doubling of the width of the vibratory beam is offset by a smaller change in the length of the vibratory beam. Alternately, the thickness of the vibratory beam can be changed instead of the length, but in that case the stiffness is proportional to the square of the thickness. Thus, when apparatus must be produced to measure an increased force (weight), the structure is designed by making a simple modification to the vibratory beams without requiring the addition of special lever arrangements.

The use of a rotational mass coupled to a nodal point of a vibratory beam results in a sensor that can be manufactured easily at a reduced cost. Because the tolerances for manufacture of the components of the sensor are relaxed, precise methods of cutting are not required. Thus, the sensor can be molded, formed of a material such as aluminum oxide or ceramics, or the force (weight) measuring apparatus can be fabricated from a metal blank using a press tool. In a preferred embodiment, the sensor is formed by stamping of metal. When the sensor 10 is fabricated from a metal blank using a press tool, the strength and rigidity of the sensor is increased by work hardening. Alternately, the sensor can be formed by machining.

Although in the preferred embodiments of the invention, the vibratory beam is made out of a suitable non-piezoelectric material and is coupled to a piezoelectric driver, the invention can also be utilized with a piezoelectric vibratory beam, eliminating the need for a piezoelectric driver.

An alternate embodiment of the invention is shown in FIG. 6, in which the same reference numerals are used to designate components similar to those present in the embodiment shown in FIG. 5. In this embodiment, no legs are provided on mounting plate 24 for attaching a printed circuit board to the mounting plate. Additionally, first longitudinal extension 22 and second longitudinal extension 20 are twisted by approximately 180° instead of 90°. Although this aids in minimizing any mismatch in the stress applied to the first and second vibratory beams, this function is achieved more effectively when a 90° twist is utilized.

FIGS. 7-9 show an alternate embodiment of force sensor 10. In this preferred embodiment of the invention, the force (weight) measuring apparatus is fabricated by a metal blank using a press tool, achieving the advantages described previously. Force sensor 10 is fabricated from a metal blank 130, which is shown in FIG. 8. As embodied herein, a thin metal sheet is used for fabrication of sensor 10. Accordingly, blank 130 may be stamped from a beryllium copper sheet and subsequently fabricated. In this embodiment, first and second vibratory beams 12 and 14 are typically 0.55 mm thick, which is considerably thinner than the thickness of the vibratory beams shown in FIGS. 5 and 6, which are approximately 2.25 mm thick. This reduces the cost of materials used in fabricating the sensor, allowing more expensive materials having higher values of Q to be used without increasing total costs.

As embodied in FIG. 7, the planar orientation of first and second vibratory beams 12 and 14 is at right angles to the arrangement of the first and second vibratory beams shown in FIGS. 5-6. In each of the embodiments, the vibration occurs in the direction along which the thickness of the beam is measured, and this re-orientation of the beams does not change the performance. Rotational masses 13a and 15b are parallel to and offset from respective rotational masses 13c and 15c, all of which are perpendicular to the planar surface of the respective vibratory beam. The force sensor operates in a manner similar to that for the embodiments shown in FIGS. 5 and 6. Because of the presence of the rotational masses, a relaxation in tolerances occurs—for example, if there is a slight offset between the rotational masses for the point at which the limbs 13b and 13c are bent with respect to arm 13a, performance of the sensor will not be greatly affected. Limbs 13b, 13c, 15b, and 15c are arranged in a manner so that there is minimum air resistance to their rotation in a pendulum-like manner.

It will be apparent to those skilled in the art that various modifications and variations can be made in the sensor of the present invention without departing from the scope or spirit of the invention. As an example, a rotational mass can be made in various forms, and can be coupled to a nodal point on a vibratory beam in a variety of ways. Thus, it is intended that the present invention cover the modifications and variations of this invention provided they come within the scope of the appended claims and their equivalents.

What is claimed is:

1. An apparatus for measuring a force, comprising:
   a vibratory beam which vibrates back and forth at a measurement frequency, said beam having a portion located between a first and a second end nodal point wherein the greatest vibration of the beam back and forth at the measurement frequency occurs, said beam further having an internal nodal point between the first and second end nodal points that does not vibrate back and forth at the measurement frequency, and having a first and second end, wherein the first and second end nodal points are respectively located adjacent the first and second ends of the beam;
   support means for supporting the force to be measured;
   means for coupling the first end of the vibratory beam to the support means for applying a stress to the vibratory beam that determines the measurement frequency at which the beam vibrates; and
   a rotational mass coupled to the internal nodal point of the vibratory beam that rotates at the measurement frequency.

2. The force measuring apparatus of claim 1, further comprising:
   a mounting means attached to the second end of the vibratory beam.

3. The force measuring apparatus of claim 1, further comprising:
   a piezoelectric receiver coupled to the vibratory beam for generating output signals at the measurement frequency at which the vibratory beam is vibrating back and forth.

4. The force measuring apparatus of claim 3, further comprising:
   microcomputer means coupled to the piezoelectric receiver and responsive to the output signals for determining the size of the weight.

5. The force measuring apparatus of claim 3, in which the piezoelectric receiver is coupled to the vibratory beam at a maximum point where the greatest vibration back and forth at the measurement frequency occurs for the vibratory beam.

6. The force measuring apparatus of claim 3, in which a piezoelectric driver is coupled to the vibratory beam at a maximum point where the greatest vibration back and forth at the measurement frequency occurs for the vibratory beam.

7. The force measuring apparatus of claim 3, in which the vibratory beam is made of a non-piezoelectric material, and further comprising:
   a piezoelectric driver, coupled to the vibratory beam, that vibrates when input signals are applied to the driver.

8. The force measuring apparatus of claim 7, in which the vibratory beam, the support means, the means for coupling to the support means, and the rotational mass are formed of beryllium copper.

9. The force measuring apparatus of claim 7, in which the vibratory beam, the support means, and the means for coupling to the support means are formed of beryllium copper.

10. The force measuring apparatus of claim 7, in which the vibratory beam, the support means, the means for coupling to the support means, and the rotational mass are fabricated from a metal blank using a press tool.

11. The force measuring apparatus of claim 7, in which the vibratory beam, the support means, and the means for coupling to the support means are fabricated from a metal blank using a press tool.

12. The force measuring apparatus of claim 7, in which the piezoelectric receiver is coupled to the vibratory beam at a maximum point where the greatest vibration back and forth at the measurement frequency occurs for the vibratory beam.

13. The force measuring apparatus of claim 7, in which the piezoelectric driver is coupled to the vibratory beam at a maximum point where the greatest vibration back and forth at the measurement frequency occurs for the vibratory beam.

14. The force measuring apparatus of claim 7, in which the vibratory beam, the support means, the means for coupling to the support means, and the rotational mass are formed by molding.

15. The force measuring apparatus of claim 7, in which the vibratory beam, the support means, and the means for coupling to the support means are formed by molding.

16. The force measuring apparatus of claim 7, in which the vibratory beam, the support means, the means for coupling to the support means, and the rotational mass are formed of aluminum oxide.

17. The force measuring apparatus of claim 7, in which the vibratory beam, the support means, and the means for coupling to the support means are formed of aluminum oxide.

18. The force measuring apparatus of claim 7, in which the vibratory beam, the support means, the means for coupling to the support means, and the rotational mass are made of a piezoelectric material.

19. The force measuring apparatus of claim 7, in which the vibratory beam, the support means, and the means for coupling to the support means are made of a piezoelectric material.

20. An apparatus for measuring a force, comprising:
   a pair of parallel vibratory beams coupled together at a first end and a second end of each beam and forming a tuning fork, with each beam having a portion which vibrates back and forth at a measurement frequency, and having a nodal point that does not vibrate back and forth at the measurement frequency;
   support means for supporting the force to be measured;
   means for coupling the first end of the vibratory beams to the support means for applying a stress to the vibratory beams that determines the measurement frequency at which the beams vibrate; and
   a rotational mass coupled to the nodal point of each vibratory beam that rotates at the measurement frequency.

21. The force measuring apparatus of claim 20, further comprising:

a mounting means attached to the second end of the first and second vibratory means.

22. The force measuring apparatus of claim 20, further comprising:
a first end portion on each of said beams for coupling the first ends of the beams together and a second end portion on each of said beams for coupling the second end of said beams together.

23. The force measuring apparatus of claim 22, in which each end portion includes a protrusion projecting inwardly for cancelling vibration in the respective end portion.

24. The force measuring apparatus of claim 22, further comprising:
a mounting means for the apparatus; and
means for coupling the second end portion to the mounting means for minimizing damping of the first and second vibratory beams.

25. The force measuring apparatus of claim 24, in which the means for coupling the second end portion to the mounting means comprises an extension that is twisted for applying substantially the same stress to the first and second vibratory beams.

26. The force measuring apparatus of claim 25, in which the extension is twisted approximately 90°.

27. The force measuring apparatus of claim 22, in which the means for coupling the first end of the first and second vibratory beams to the support means directly connects the support means to the first end portion.

28. The force measuring apparatus of claim 27, in which the means for coupling to the support means comprises an extension that is twisted for applying substantially the same stress to the first and second vibratory beams.

29. The force measuring apparatus of claim 28, in which the extension is twisted approximately 90°.

30. The force measuring apparatus of claim 20, further comprising:
a piezoelectric receiver coupled to one of the vibratory beams for generating output signals at the measurement frequency at which the one vibratory beam is vibrating back and forth.

31. The force measuring apparatus of claim 30, further comprising:
microcomputer means coupled to piezoelectric receiver and responsive to the output signals for determining the size of the force.

32. The force measuring apparatus of claim 30, in which the piezoelectric receiver is coupled to the one vibratory beam at a maximum point where the greatest vibration back and forth at the measurement frequency occurs for the one vibratory beam.

33. The force measuring apparatus of claim 32, in which a piezoelectric driver is coupled to the other vibratory beam at a maximum point where the greatest vibration back and forth at the measurement frequency occurs for the other vibratory beam.

34. The force measuring apparatus of claim 30, in which the first and second vibratory beams are made of a non-piezoelectric material, and further comprising:
a piezoelectric driver, coupled to one of the vibratory beams, that vibrates when input signals are applied to the driver.

35. The force measuring apparatus of claim 34, in which the piezoelectric driver is coupled to the one vibratory beam at a maximum point where the greatest vibration back and forth at the measurement frequency occurs for the one vibratory beam.

36. The force measuring apparatus of claim 34, in which the pair of parallel vibratory beams, the support means, the means for coupling to the support means, and the rotational mass are fabricated from a metal blank using a press tool.

37. The force measuring apparatus of claim 34, in which the pair of parallel vibratory beams, the support means, the means for coupling to the support means, and the rotational mass are formed of beryllium copper.

38. The force measuring apparatus of claim 34, in which the pair of parallel vibratory beams, the support means, and the means for coupling to the support means are formed of beryllium copper.

39. The force measuring apparatus of claim 34, in which the pair of parallel vibratory beams, the support means, and the means for coupling to the support means are fabricated from a metal blank using a press tool.

40. The force measuring apparatus of claim 34, in which the piezoelectric receiver is coupled to the one vibratory beam at a maximum point where the greatest vibration back and forth at the measurement frequency occurs for the one vibratory beam.

41. The force measuring apparatus of claim 34, in which the pair of parallel vibratory beams, the support means, and the means for coupling to the support means are formed by molding.

42. The force measuring apparatus of claim 34, in which the pair of parallel vibratory beams, the support means, the means for coupling to the support means, and the rotational mass are formed by molding.

43. The force measuring apparatus of claim 34, in which the pair of parallel vibratory beams, the support means, and the means for coupling to the support means are formed of aluminum oxide.

44. The force measuring apparatus of claim 34, in which the pair of parallel vibratory beams, the support means, the means for coupling to the support means, and the rotational mass are formed of aluminum oxide.

45. The force measuring apparatus of claim 34, in which the pair of parallel vibratory beams, the support means, and the means for coupling to the support means are made of a piezoelectric material.

46. The force measuring apparatus of claim 34, in which the pair of parallel vibratory beams, the support means, the means for coupling to the support means, and the rotational mass are made of a piezoelectric material.

47. An apparatus for measuring a force, comprising:
a pair of parallel vibatory tines coupled together at a first end and a second end of each tine and forming a tuning fork, with each tine having a portion which vibrates back and forth at a measurement frequency, and having a nodal point that does not vibrate back and forth at the measurement frequency;
support means for supporting the force to be measured;
means for coupling the first end of the vibratory tinse to the support means for applying a stress to the vibratory tines that determines the measurement frequency at which the tines vibrate; and
a rotational mass coupled to the nodal point of each vibratory tine that rotates at the measurement frequency.

48. An apparatus for measuring a force, comprising:

a vibratory linear element which vibrates back and forth at a measurement frequency, said linear element having a portion located between a first and a second end nodal point wherein the greatest vibration fo the linear element back and forth at the measurement frequency occurs, said linear element further having an internal nodal point between the first and second end nodal points that does not vibrate back and forth at the measurment frequency, and having a first and second end, wherein the first and second end nodal points are respectively located adjacent the first and second ends of the linear element;

support means for supporting the force to be measured;

means for coupling the first end of the vibratory linear element to the support means for applying a stress to the vibratory linear element that determines the measurement frequency at which the linear element vibrates; and a rotational mass coupled to the internal nodal point of the vibratory linear element that rotates at the measurement frequency.

* * * * *